US007689206B2

(12) United States Patent
Vander Veen et al.

(10) Patent No.: US 7,689,206 B2
(45) Date of Patent: *Mar. 30, 2010

(54) HANDHELD ELECTRONIC DEVICE PROVIDING AN ALERT WHEN ADDITIONAL USER ACTION IS REQUIRED TO INITIATE AN OUTGOING PHONE CALL, AND ASSOCIATED METHOD

(75) Inventors: Raymond P. Vander Veen, Waterloo (CA); Neil P. Adams, Waterloo (CA)

(73) Assignee: Research In Motion Ltd., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/185,359

(22) Filed: Aug. 4, 2008

(65) Prior Publication Data

US 2008/0293452 A1    Nov. 27, 2008

Related U.S. Application Data (63) Continuation of application No. 11/859,970, filed on Sep. 24, 2007, now Pat. No. 7,424,287, which is a continuation of application No. 11/064,709, filed on Feb. 24, 2005, now Pat. No. 7,286,820.

(51) Int. Cl.
*H04L 29/08* (2006.01)
*H04M 1/00* (2006.01)

(52) U.S. Cl. .................. 455/414.4; 455/550.1

(58) Field of Classification Search .......... 455/414.1, 455/550.1, 465.5, 574, 343.4, 344, 566, 417, 455/69, 556.1, 556.2, 412.2, 466, 445

See application file for complete search history.

(56) References Cited

U.S. PATENT DOCUMENTS

| 5,797,089 | A | 8/1998 | Nguyen |
| 6,042,383 | A | 3/2000 | Herron |
| 6,282,435 | B1 | 8/2001 | Wagner et al. |
| 6,760,580 | B2 | 7/2004 | Robinson et al. |
| 6,763,238 | B1 | 7/2004 | Okano |
| 7,286,820 | B2 * | 10/2007 | Vander Veen et al. .... 455/414.4 |
| 7,308,088 | B1 | 12/2007 | Henderson |
| 2002/0119768 | A1 | 8/2002 | Matsumoto et al. |
| 2003/0139150 | A1 | 7/2003 | Rodriguez et al. |
| 2005/0113113 | A1 | 5/2005 | Reed |

\* cited by examiner

*Primary Examiner*—Melody Mehrpour
(74) *Attorney, Agent, or Firm*—Eckert Seamans Cherin & Mellott, LLC; Brij K. Agarwal, Esq.

(57) ABSTRACT

A method of facilitating the initiation of an outgoing phone call on a handheld electronic device including receiving a request to initiate the outgoing phone call and determining whether additional user action is required in order to initiate the outgoing phone call. If it is determined that additional user action is required, the method further includes: (i) displaying a prompt on the handheld electronic device that indicates that the additional user action must be taken in order to initiate the outgoing phone call, and (ii) providing an alert, such as an audible signal, that is separate from the prompt. Also, a handheld electronic device including a display, a processor, and a memory in electronic communication with the processor. The memory stores one or more routines executable by the processor for implementing the described method.

12 Claims, 7 Drawing Sheets

HANDHELD ELECTRONIC DEVICE PROVIDING AN ALERT WHEN ADDITIONAL USER ACTION IS REQUIRED TO INITIATE AN OUTGOING PHONE CALL, AND ASSOCIATED METHOD

CROSS-REFERENCE TO RELATED APPLICATIONS

This application is a continuation of U.S. application Ser. No. 11/859,970 entitled "Handheld Electronic Device Providing an Alert When Additional User Action is Required to Initiate an Outgoing Phone Call, and Associated Method," which was filed on Sep. 24, 2007 now U.S. Pat. No. 7,424,287, which is a continuation of U.S. application Ser. No. 11/064,709 filed Feb. 24, 2005, now U.S. Pat. No. 7,286,820 issued Oct. 23, 2007, entitled "Handheld Electronic Device Providing Alert When Additional User Action is Required to Initiate an Outgoing Phone Call, and Associated Method."

BACKGROUND

1. Field

The disclosed concept relates generally to handheld electronic devices and, more particularly, to a handheld electronic device that provides an alert to a user when a user attempts to initiate an outgoing phone call and the call cannot be initiated because additional user action is required. The disclosed concept also relates to a method of providing such an alert to a user of a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are relatively small. Many handheld electronic devices also feature wireless communication capability, although many such handheld electronic devices are stand-alone devices that are functional without communication with other devices.

Many handheld electronic devices include and provide access to a wide range of integrated applications, including, without limitation, email, telephone, short message service (SMS), multimedia messaging service (MMS), browser, calendar and address book applications, such that a user can easily manage information and communications from a single, integrated device. These applications are typically selectively accessible and executable through a user interface that allows a user to easily navigate among these applications.

Many devices that provide telephone functionality include dedicated <SEND> and <END> keys, or the like, for enabling a user to initiate a new call, answer an incoming call, or terminate a call that is in progress. The <SEND> key is typically able to initiate an outgoing phone call when the user presses the key after the user either: (i) enters or initiates the device's telephone application and enters a phone number or selects a stored phone number (such as a number stored in a call log), or (ii) enters or initiates the device's address book application and selects a particular stored contact.

Most address book applications enable a user of the associated handheld electronic device to store multiple phone numbers for a given contact (e.g., home, office and mobile). This, however, presents a problem when outgoing phone calls to a selected contact are initiated from the address book application by depression of the <SEND> key. In particular, if a contact with more than one stored phone number is selected by a user and the user subsequently presses the <SEND> key intending to initiate a phone call to that contact, instead of initiating a phone call, the user interface of the device will display a screen containing a prompt that requests the user to select one of the multiple stored phone numbers to actually be called. Many users, however, forget that multiple phone numbers have been stored for certain contacts and often miss the displayed prompt because they expect the call to begin immediately and therefore quickly place the device to their ear after the <SEND> key has been pressed. It typically takes a few moments for the user to realize that a call is not being initiated and that instead a selection of a particular phone number must first be made. A similar problem can arise if the radio element of a handheld electronic device that enables wireless phone calls to be initiated and received has been turned off by the user, such as to conserve battery power, and the user subsequently attempts to initiate a phone call (forgetting that the radio has been tuned off). In such a situation, the user interface of the handheld electronic device will typically display a screen that informs the user that the radio is currently off and asks the user whether the radio should be turned on. Again, in many cases the user will have already placed the device to his or her ear waiting for the call to be completed and, as a result, will not see the screen that is displayed. For obvious reasons, these situations present both an annoyance and an inconvenience to the user.

BRIEF DESCRIPTION OF THE DRAWINGS

A full understanding of the disclosed concept can be gained from the following Description of the Preferred Embodiments when read in conjunction with the accompanying drawings in which.

Similar numerals refer to similar parts throughout the specification.

DESCRIPTION OF THE PREFERRED EMBODIMENTS

An improved handheld electronic device and an associated method provide a mechanism for alerting a user that additional action is required in order to complete an outgoing phone call. As a result, users will be less likely to immediately place the handheld electronic device to their ear expecting a the call to be completed, when in fact no call will be initiated until the user takes farther action.

These and other aspects of the disclosed concept are provided by a method of facilitating the initiation of an outgoing phone call on a handheld electronic device including receiving a request to initiate the outgoing phone call, such as from the depression of the <SEND> key of the device, and determining whether additional user action is required in order to initiate the outgoing phone call. In addition, if it is determined that additional user action is required, the method further includes: (i) displaying a prompt on the handheld electronic device that indicates that the additional user action must be taken in order to initiate the outgoing phone call, and (ii) providing an alert that is separate from the prompt. Preferably, the alert comprises an audible signal such as a tone(s) or beep(s) or a voice recording, although the alert may also take other forms, such as, without limitation, a vibration generated by the handheld electronic device. The alert may be a one-time alert, or may be an alert that is repeated periodically.

In one particular embodiment, the handheld electronic device includes an address book application having a plurality of stored contacts, and the method further includes receiving a selection of one of the stored contacts prior to receiving the request to initiate the outgoing phone call. In this embodiment, the method includes determining whether the selected stored contact has two or more phone numbers stored in connection therewith, wherein the additional user action that is required is a selection of one of the phone numbers by the user. If one of the phone numbers is selected, the method further includes initiating the phone call to the selected phone number. In addition, in this embodiment the method also includes determining whether the device's radio element is turned off. If the radio element is determined to be off, the method includes causing the radio element to be turned on, after which the call may be initiated.

The disclosed concept also relates to a handheld electronic device including a display, a processor, and a memory in electronic communication with the processor. The memory stores one or more routines executable by the processor. The one or more routines include instructions for implementing and performing the various embodiments of a method for facilitating the initiation of an outgoing phone call on a handheld electronic device as described herein.

Figure 1:
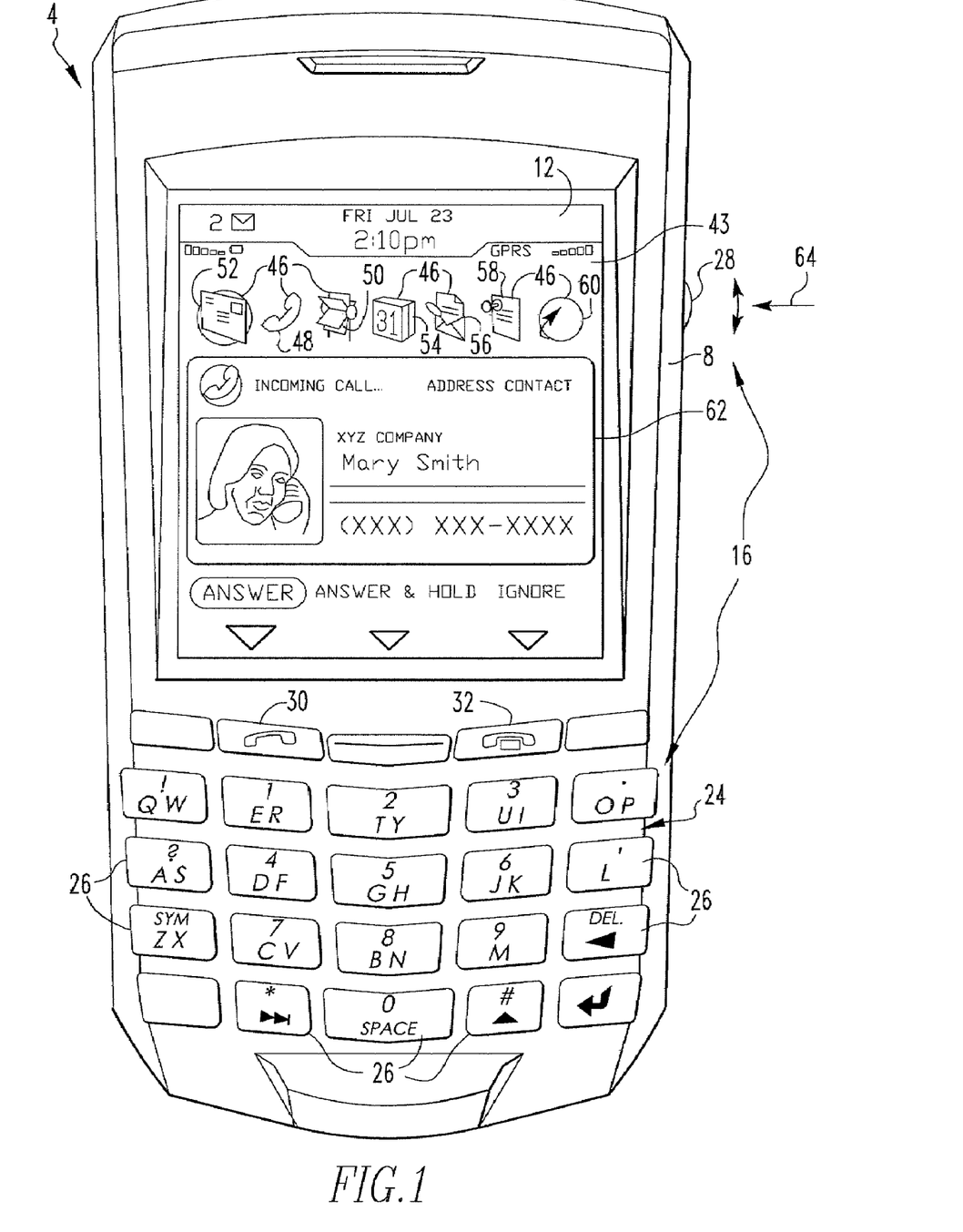
FIG. 1 is a front elevational view of an improved handheld electronic device in accordance with the disclosed concept.
Figure 2:
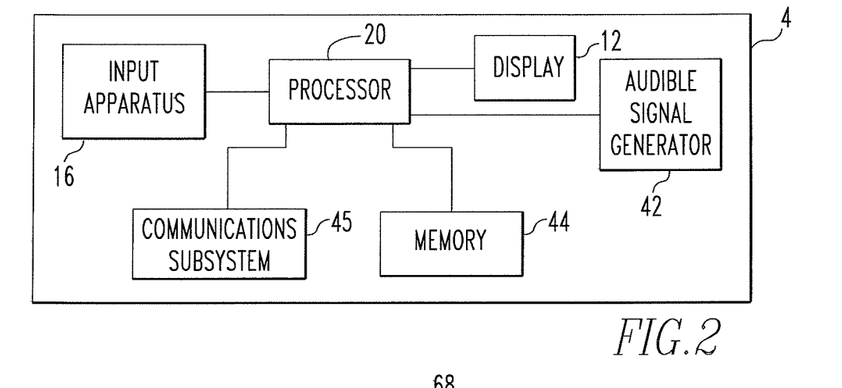
FIG. 2 is a block diagram of the handheld electronic device of FIG. 1.

An improved handheld electronic device 4 in accordance with the disclosed concept is depicted generally in FIGS. 1 and 2. The handheld electronic device 4 includes a housing 8, a display 12, an input apparatus 16, and a processor 20 (FIG. 2) which may be, without limitation, a microprocessor (μP). The processor 20 is responsive to inputs received from the input apparatus 16 and provides outputs to the display 12. Examples of handheld electronic devices are included in U.S. Pat. Nos. 6,452,588 and 6,489,950. The handheld electronic device 4 is of a type that includes a cellular telephone capability and, as will be described in greater detail below, provides an alert when additional user action following a request to initiate an outgoing phone call, such as through the depression of a <SEND> key or the like, is required to initiate a phone call. As used herein, the terms "phone" and "telephone" shall refer to any type of voice communication initiated and conducted over a wired and/or wireless network.

As can be understood from FIG. 1, the input apparatus 16 includes a keyboard 24 having a plurality of keys 26, and a rotatable thumbwheel 28. As used herein, the expression "key" and variations thereof shall refer broadly to any of a variety of input members such as buttons, switches, and the like without limitation. The keys 26 and the rotatable thumbwheel 28 are input members of the input apparatus 16, and each of the input members has a function assigned thereto. Keys 26 include a <SEND> key 30 and an <END> key 32, the functions of which will be described in greater detail below. The keys 30, 32 may include suitable text and/or graphics (as shown) disposed (e.g., printed) thereon.

As is shown in FIG. 2, the processor 20 is in electronic communication with memory 44. Memory 44 can be any of a variety of types of internal and/or external storage media such as, without limitation, RAM, ROM, EPROM(s), EEPROM(s), and the like, that provide a storage register for data storage such as in the fashion of an internal storage area of a computer, and can be volatile memory or nonvolatile memory. The memory 44 further includes a number of routines executable by processor 20 for the processing of data. The routines can be in any of a variety of forms such as, without limitation, software, firmware, and the like, and shall include one or more subroutines, processes, procedures, function calls or the like, alone or in combination.

Processor 20 is in electronic communication with audible signal generator 42. Audible signal generator 42 is adapted to, under the control of processor 20, produce one or more audible signals, including, without limitation, a tone, beep or voice recording. Audible signal generator 42 may include any type of known speaker or other device capable of selectively producing such audible signals.

As is also shown in FIG. 2, processor 20 is in electronic communication with communications subsystem 45. Communications functions for handheld electronic device 4, including data and voice communications, are performed through communications subsystem 45. Communications subsystem 45 includes a transmitter and a receiver (possibly combined in a single transceiver component) and one or more antennas. Other known components, such as a digital signal processor and a local oscillator, may also be part of communications subsystem 45. The specific design and implementation of communications subsystem 45 is dependent upon the communications network in which handheld electronic device 4 is intended to operate. For example, handheld electronic device 4 may include a communications subsystem 45 designed to operate with the Mobitex™, Dat TAC™ or General Packet Radio Service (GPRS) mobile data communication networks and also designed to operate with any of a variety of voice communications networks, such as AMPS, TDMA, CDMA, PCS, GSM, and other suitable networks. Other types of data and voice networks, both separate and integrated, may also be utilized with handheld electronic device 4. All or part of communications subsystem 45 may be referred to herein as a "radio element." As is known, the radio element may be selectively turned on and off (unable to transmit) by a user. As user may, for example, turn the radio element off to conserve battery power.

In FIG. 1, the display 12 is depicted as displaying a home screen 43 that includes a number of applications depicted as discrete icons 46, including an icon representing a phone application 48, an address book application 50 for storing information for a plurality of contacts, a messaging application 52 which includes email, SMS and MMS applications, a calendar application 54, a memo application 56 for enabling a user to create documents and to record notes, lists and the like, a task application 58 for enabling a user to create and manage lists of tasks, and a browser application 60 for accessing and navigating the Internet.

In FIG. 1, the home screen 43 is currently active and would constitute a portion of an application. In addition, display 12 shown in FIG. 1 shows a dialog box 62 that indicates that there is currently a phone call coming into handheld electronic device 4. Dialog box 62 provides certain information relating to the incoming call, including, for example, the caller's phone number and identifying information if the caller and phone number are stored as a contact by address book application 50 of handheld electronic device 4. Other applications, such as phone application 48, address book application 50, messaging application 52, calendar application 54, memo application 56, task application 58 or browser application 60, can be initiated from the home screen 43 by providing an input through the input apparatus 16, such as by rotating the thumbwheel 28 and providing a selection input by translating the thumbwheel 28 in the direction indicated by the arrow 64 in FIG. 1.

Figure 3:
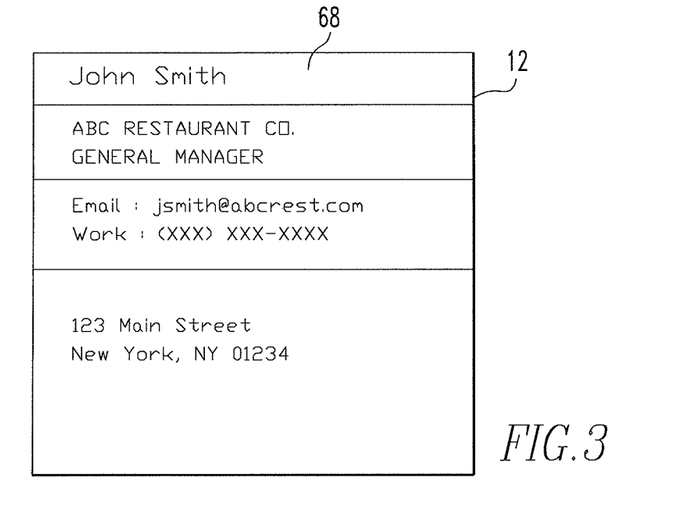
FIGS. 3 and 4 are views of exemplary contact information screens provided on the display of the handheld electronic device of FIGS. 1 and 2.
Figure 4:
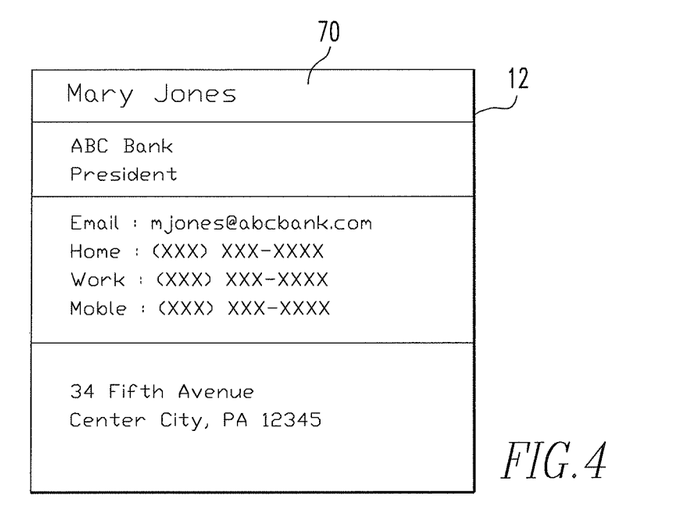

As is known in the art, address book application 50 allows the user of handheld electronic device 4 to store contact related information for a number of contacts, including, among other things, the contact's name, phone number, home and office addresses, email address, and other information that may be used to contact the person. In addition, address book application 50 allows the user to store multiple phone numbers for a given contact. For example, a user may store a home, work and mobile phone number for a particular contact. FIG. 3 is a view of an exemplary contact information screen 68 provided on display 12 of handheld electronic device 4. Contact information screen 68 includes the contact information for a particular contact stored by the address book application 50 of handheld electronic device 4. As seen in FIG. 3, contact information screen 68 includes only a single (work) phone number for the contact. FIG. 4 is a view of another exemplary contact information screen 70 provided on display 12. Contact information screen 70 includes the contact information for another particular contact stored by the address book application 50 of handheld electronic device 4 and, as seen in FIG. 4, includes three (home, work and mobile) phone numbers for the contact.

Figure 5:
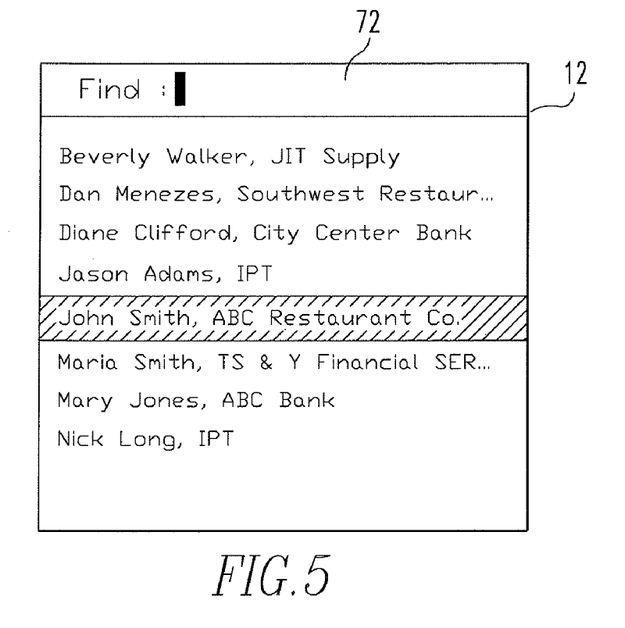
FIG. 5 is a view of an exemplary contact search screen provided on the display of the handheld electronic device of FIGS. 1 and 2.
Figure 6:
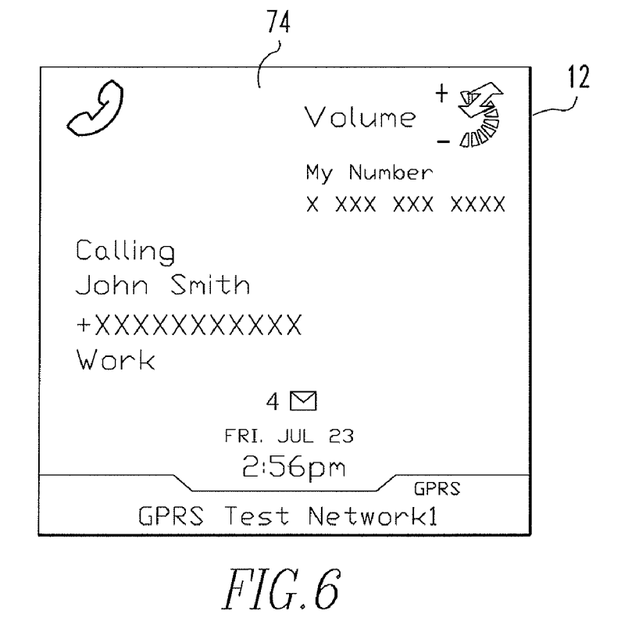
FIG. 6 is a view of an exemplary an outgoing call screen provided on the display of the handheld electronic device of FIGS. 1 and 2.
Figure 7:
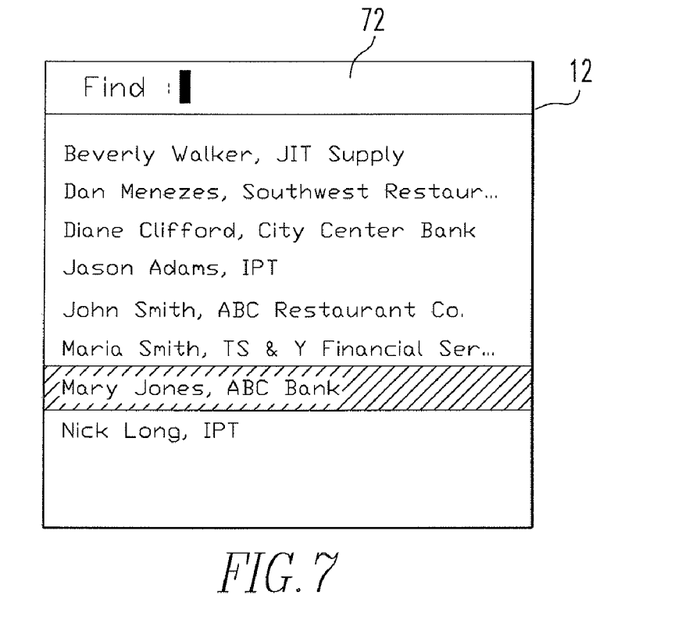
FIG. 7 is an alternative view of the exemplary contact search screen shown in FIG. 5.
Figure 8:
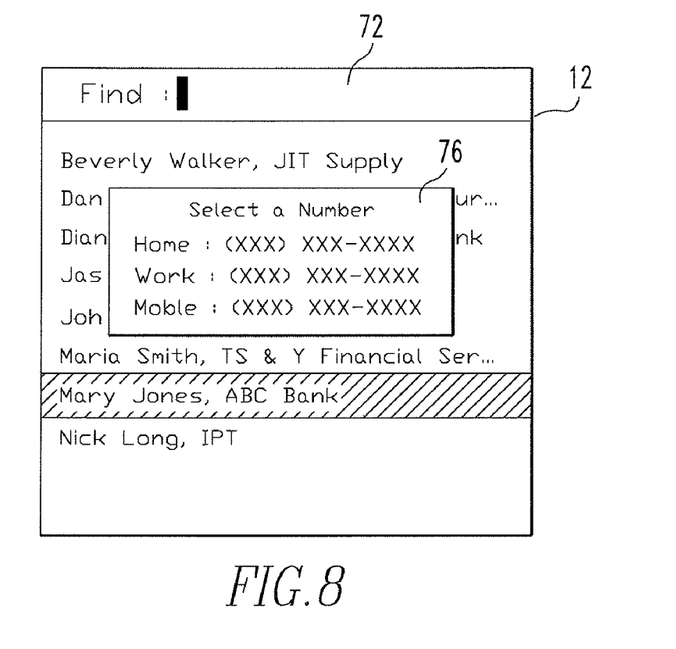
FIG. 8 is a view of the exemplary contact search screen shown in FIG. 7 having a prompt displayed thereon indicating that additional user action is required.
Figure 9:
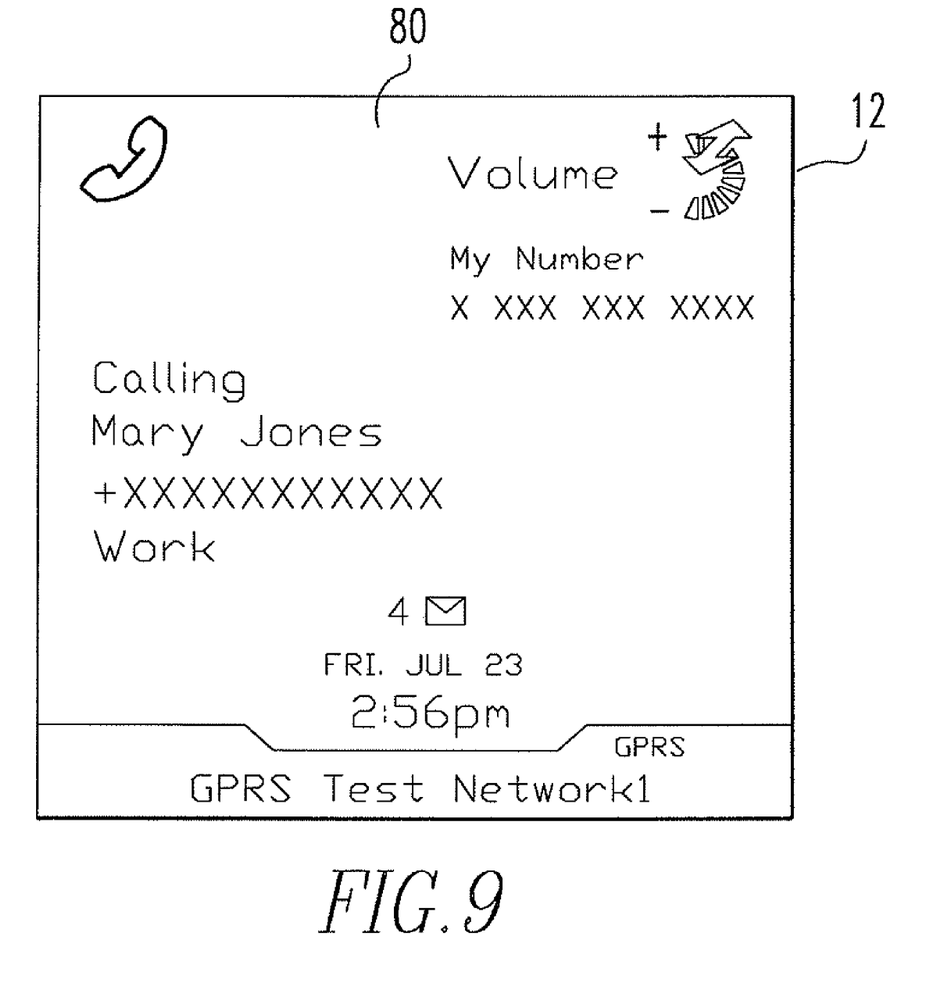
FIG. 9 is a view of another exemplary outgoing call screen provided on the display of the handheld electronic device of FIGS. 1 and 2.

FIG. 5 is a view of an exemplary contact search screen 72 provided on display 12 of handheld electronic device 4. Contact search screen 72 may be used to search the contacts stored by the address book application 50 of handheld electronic device 4. As seen in FIG. 5, contact search screen 72 includes a listing, by name, of several of the stored contacts. A user may select a particular contact listed in contact search screen 72 using input apparatus 16, such as by rotating the thumbwheel 28 and providing a selection input by translating the thumbwheel 28 in the direction indicated by the arrow 64 in FIG. 1. Once selected, the contact will be highlighted as shown in FIG. 5. A user may then initiate an outgoing phone call to the selected contact by pressing the <SEND> key 30, or, alternatively, accessing a menu and selecting a "Call" function from the menu. Because, as shown in FIG. 3, the particular selected contact in this case has only a single phone number stored in connection therewith by the address book application 50, the outgoing call will be immediately initiated. As a result, an outgoing call screen 74 shown in FIG. 6 is displayed on display 12 that indicates that the call to the selected contact has been initiated. If, however, as shown in FIG. 7, a contact having multiple stored phone numbers, such as the contact displayed by contact information screen 70 in FIG. 4, is selected and the user subsequently attempts to initiate an outgoing phone call to that contact by pressing the <SEND> key 30, or, alternatively, accessing a menu and selecting a "Call" function from the menu, a phone call will not be immediately initiated. Instead, because multiple phone numbers exist for that contact, dialog box 76 will be presented in contact search screen 72 shown on display 12 as seen in FIG. 8. Dialog box 76 includes a request that the user select, using input apparatus 16, a particular phone number to be called. Once selected, as shown in FIG. 9, an outgoing call is initiated to the selected phone number, and an outgoing call screen 80 is displayed on display 12 that indicates that the call to the contact at the selected number has been initiated.

However, as discussed above, a problem often arises due to the fact that many users frequently forget that there are multiple stored phone numbers for some of the contacts. Such a user will, after selecting a contact having multiple stored phone numbers, typically then immediately place handheld electronic device 4 to their ear, expecting the call to have been immediately initiated. By doing so, the user does not see the dialog box 76 that requests that they choose a particular number to call. It then typically takes a few moments for the user to realize that a call has not been initiated. The user will then remove handheld electronic device 4 from their ear and see dialog box 76 for the first time. This is obviously an annoying and inconvenient circumstance for the user.

Figure 10:
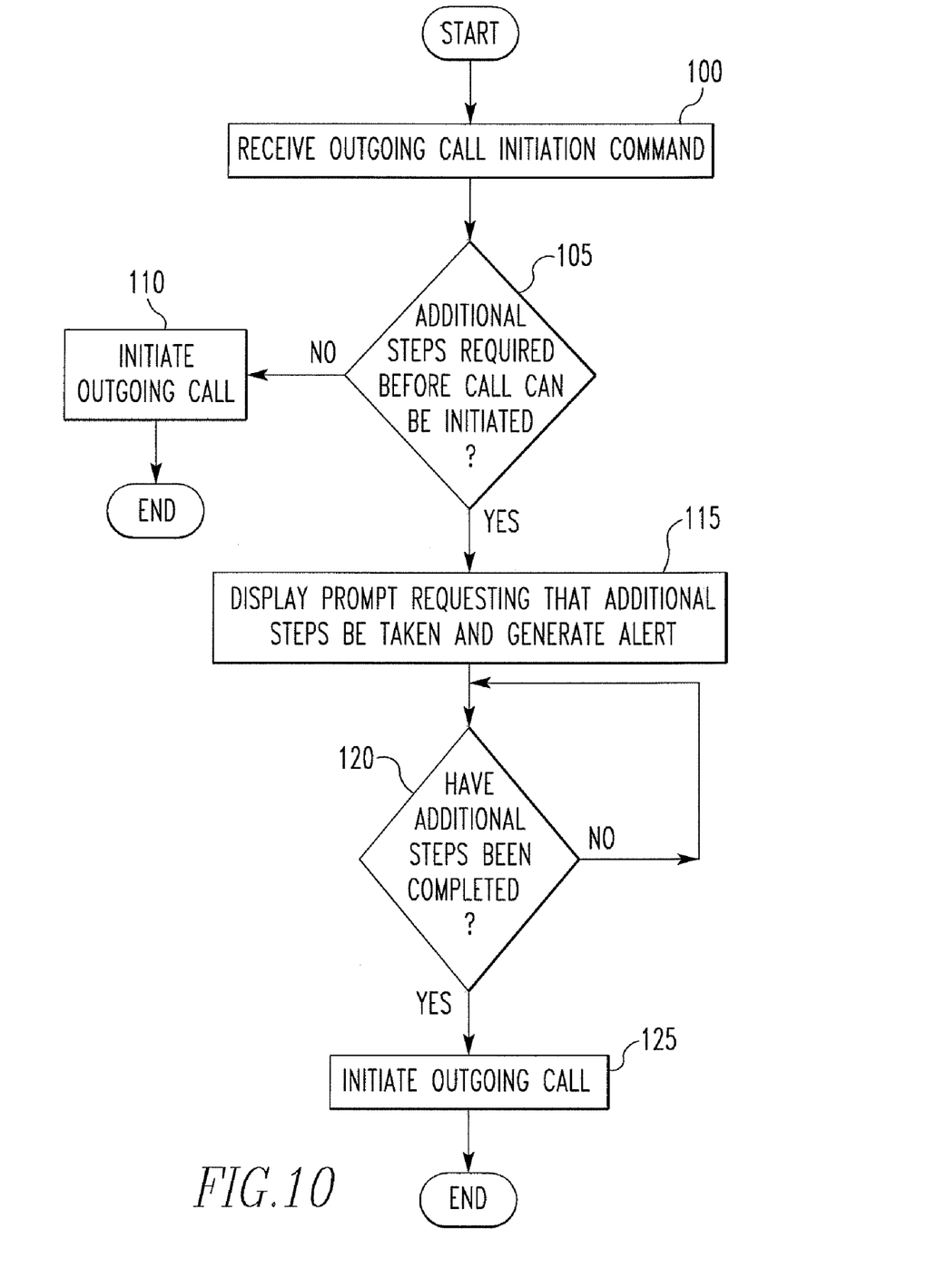
FIG. 10 is a flowchart depicting a routine executed by the processor of the handheld electronic device of FIGS. 1 and 2 for providing an alert to a user indicating that additional steps are required to initiate a requested outgoing phone call on the handheld electronic device of FIGS. 1 and 2.

FIG. 10 is a flow chart of a routine according to the disclosed concept for providing an additional alert to a user when additional action following an initiate call command, such as the depression of the <SEND> key, the accessing of a menu and the subsequent selection of a "Call" function from the menu, or the like, is required to initiate a phone call. The purpose of the alert is to gain the attention of the user before the user mistakenly places handheld electronic device to his or her ear. The routine is preferably stored in memory 44 and is executable by processor 20. The routine begins at step 100, where processor 20 receives an outgoing call initiation request/command, such as a command signal resulting from the depression of the <SEND> key 30 of handheld electronic device 4, or, alternatively, the accessing of a menu and selection of a "Call" function from the menu on handheld electronic device 4. Next, at step 105, a determination is made as to whether an additional step or steps (such as the selection of a particular phone number or the activation of the radio element) are required before the requested outgoing call can be made. If the answer at step 105 is no, then, at step 110, the requested outgoing call is initiated based on current information possessed by processor 20, for example using a number entered by the user. If, however, the answer at step 105 is yes, then, at step 115, a prompt is displayed on display 12 (for example, as shown in FIG. 8) that requests the user to take the additional action required to initiate an outgoing call. In addition, an alert is provided to the user that is intended to separately indicate to the user that the additional action is required to initiate an outgoing call. Preferably, the alert takes the form of an audible signal, such as a series of beeps or tones or a voice recording, that is output by audible signal generator 42. Alternatively, the alert may be tactile, such as the vibration of handheld electronic device 4 generated by a motor or the like provided in handheld electronic device 4, or visual, such as the flashing of a light or the like that is likely to be seen by the user (more likely to be seen than the prompt on display 12). The purpose of the separate alert is to catch the attention of the user and indicate to the user that the phone call cannot be immediately completed because additional user action is required. The alert may be provided immediately after it is determined that additional action is required, or after some period of inaction (e.g., 1-2 seconds). Next, at step 120, a determination is made as to whether the additional steps have indeed been taken. If the answer is no, then the routine returns to step 120 and awaits the completion of the additional steps. If the answer at step 120 is yes, then, at step 125, the outgoing call is initiated using communications subsystem 45, as the additional steps that were performed by the user provided the input necessary to complete the call.

Figure 11:
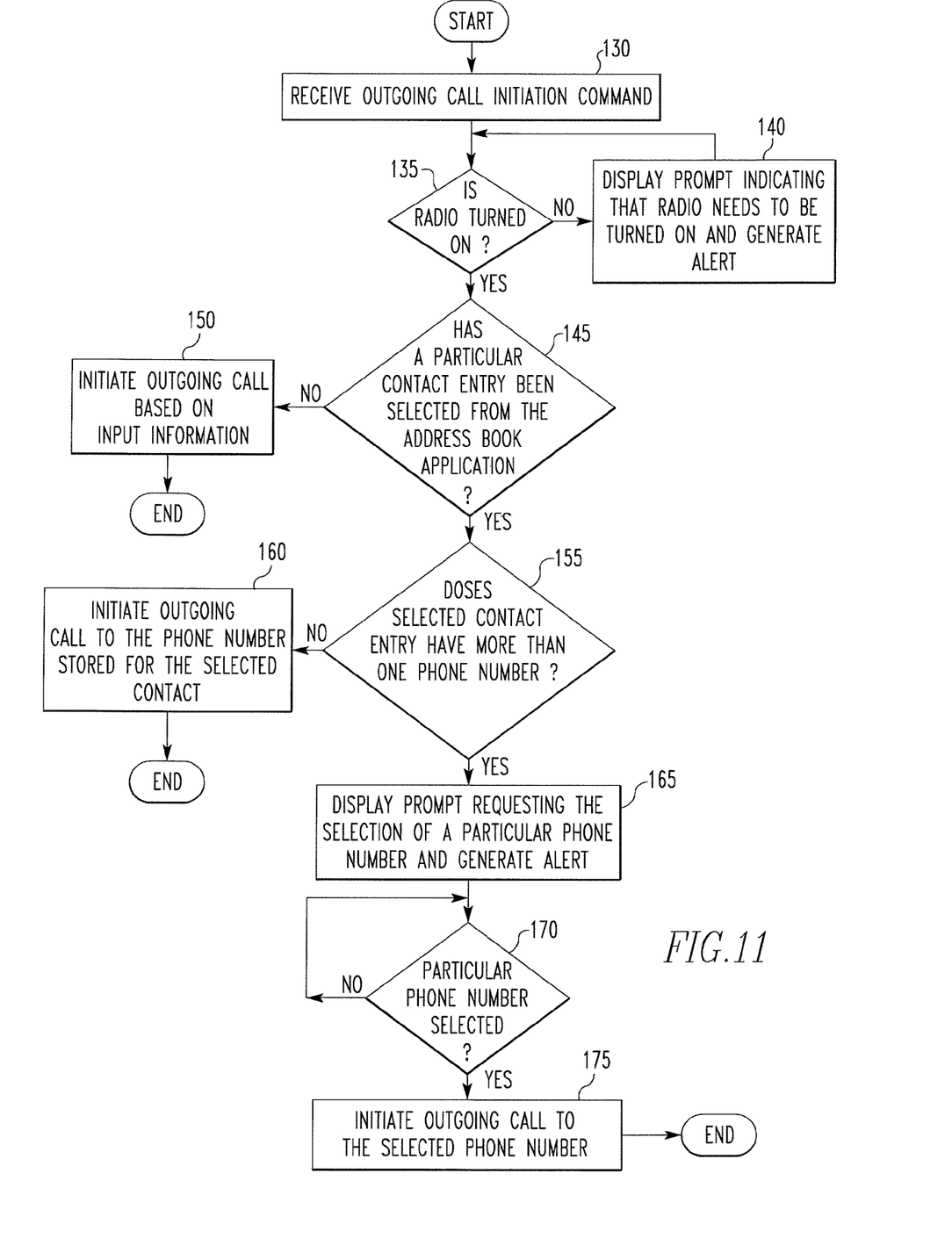
FIG. 11 is a flow chart depicting a particular embodiment of the routine shown in FIG. 10.

FIG. 11 is a flowchart of a particular implementation of the routine shown in FIG. 10. Specifically, FIG. 11 addresses situations where the additional action that must be taken to initiate an outgoing phone call includes turning on a previously turned off radio element of handheld electronic device 4 and/or choosing a particular phone number to call for a contact having multiple stored phone numbers. The routine begins at step 130, where processor 20 receives an outgoing call initiation request/command, such as a command signal resulting from the depression of the <SEND> key 30, or, alternatively, the accessing a menu and selection of a "Call" function from the menu. Next, at step 135, a determination is made as to whether the radio element of handheld electronic device 4 is turned on. If the answer is no, then, at step 140, a prompt is displayed on display 12 that indicates to the user that the radio element must be turned on in order to initiate an outgoing call. In addition, a separate alert as described above is provided to the user, preferably in the form of an audible signal, the purpose of which is to indicate to the user that the additional step of turning the radio element on is required to initiate an outgoing call. In one embodiment, the user may cause the radio element to be turned on by selecting a "turn radio on" option that is provided with the prompt displayed on display 12, which preferably is in the form of a dialog box. The routine then returns to step 135 to determine whether the radio element has been turned on.

If the answer at step 135 is yes, meaning the radio element is on, then, at step 145, a determination is made as to whether a particular contact entry was selected from the address book application 50 prior to the generation of the phone call initiation request/command (step 130). If the answer is no, then, at step 150, the requested outgoing call is initiated based on current information possessed by processor 20, for example using a number entered by the user. If, however, the answer at step 145 is yes, meaning a particular address book entry has been selected, then, at step 155, a determination is made as to whether the selected contact entry has more than one phone number (e.g., home, work and mobile) stored in connection therewith. If the answer at step 155 is no, then, at step 160, a phone call is initiated to the phone number stored in connection with the selected contact entry using communications subsystem 45. If the answer at step 155 is yes, then, at step 165, a prompt is displayed on display 12 (for example, as shown in FIG. 8) that requests the user to select a particular one of the multiple phone numbers stored in connection with the selected contact entry. At step 170, a determination is then made as to whether such a selection has been made. If not, the routine returns to step 170 to await a selection. If, however, it is determined that a selection has been made, then, at step 175, a phone call is initiated to the selected phone number using communications subsystem 45. Although the routine illustrated in FIG. 11 includes steps for addressing both the situation where the radio element of handheld electronic device 4 is turned off and the situation where a contact having multiple stored phone numbers has been selected, it will be appreciated that an alternate routine may be provided that addresses only one of these situations.

The alerts that are provided may be in the form of a single alert signal (e.g., a single beep or tone or closely spaced in time series thereof), or an alert that is repeated periodically until appropriate user action is taken. As will be appreciated, such alerts will increase the likelihood that a user will recognize and/or remember that additional action must be taken in order to initiate a requested outgoing phone call, thereby preventing the situation where a user holds handheld electronic device up to his or her ear waiting for the connection of a call that was never initiated.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A computer-readable medium for use on a handheld electronic device storing one or more computer executable routines adapted to:
   receive a request to initiate an outgoing phone call on said handheld electronic device;
   determine whether additional user action is required in order to initiate said outgoing phone call; and
   if it is determined that said additional user action is required: (i) display a prompt on said handheld electronic device, said prompt indicating that said additional user action must be taken in order to initiate said outgoing phone call, and (ii) provide an alert, said alert being separate from said prompt.

2. The computer-readable medium according to claim 1, wherein said alert comprises an audible signal generated by said handheld electronic device.

3. The computer-readable medium according to claim 1, wherein said alert comprises a vibration generated by said handheld electronic device.

4. The computer-readable medium according to claim 1, wherein said handheld electronic device includes an address book application having a plurality of stored contacts, the routines being further adapted to receive a selection of one of said stored contacts prior to receiving said request to initiate said outgoing phone call, wherein the routines are adapted to determine whether additional user action is required by determining whether said one of said stored contacts has two or more phone numbers stored in connection therewith, said additional user action comprising a selection of one of said phone numbers.

5. The computer-readable medium according to claim 4, wherein the routines are further adapted to initiate said phone call to one of said phone numbers that is selected if said one of said phone numbers is selected.

6. The computer-readable medium according to claim 1, wherein said handheld electronic device includes a radio element for enabling telephone communications capability, wherein the routines are adapted to determine whether additional user action is required by determining whether said radio element is turned off, said additional user action comprising causing said radio element to be turned on.

7. The computer-readable medium according to claim 1, wherein the routines are adapted to provide said alert by periodically providing said alert a plurality of times.

8. A computer-readable medium storing one or more computer executable routines adapted to facilitate the initiation of an outgoing phone call on a handheld electronic device having an address book application having a plurality of stored contacts and a radio element for enabling telephone communications capability, said outgoing phone call being intended for one of said stored contacts, by:

receiving a selection of said one of said stored contacts;

receiving a request to initiate said outgoing phone call to said one of said stored contacts;

determining whether said radio element is turned off;

if it is determined that said radio element is turned off: (i) displaying a prompt on said handheld electronic device indicating that said radio element must be turned on in order to initiate said outgoing phone call, and (ii) providing an alert, said alert being separate from said prompt;

determining whether said one of said stored contacts has two or more phone numbers stored in connection therewith; and if it is determined that said one of said stored contacts has two or more phone numbers stored in connection therewith: (i) displaying a prompt on said handheld electronic device indicating that one of said phone numbers must be selected in order to initiate said outgoing phone call, and (ii) providing an alert, said alert being separate from said prompt.

9. The computer-readable medium according to claim 8, wherein said alert comprises an audible signal generated by said handheld electronic device.

10. The computer-readable medium according to claim 8, wherein said alert comprises a vibration generated by said handheld electronic device.

11. The computer-readable medium according to claim 8, wherein the routines are further adapted to initiate said phone call to one of said phone numbers that is selected if said one of said phone numbers is selected.

12. The computer-readable medium according to claim 1, wherein the routines are adapted to provide said alert by periodically providing said alert a plurality of times.

* * * * *

UNITED STATES PATENT AND TRADEMARK OFFICE
CERTIFICATE OF CORRECTION

PATENT NO.         : 7,689,206 B2                                                                Page 1 of 1
APPLICATION NO.    : 12/185359
DATED              : March 30, 2010
INVENTOR(S)        : Raymond P. Vander Veen et al.

It is certified that error appears in the above-identified patent and that said Letters Patent is hereby corrected as shown below:

Figure 4, line 7, "Moble :" should read --Mobile :--.
Figure 11, middle of page, "DOSES" should read --DOES--.
Column 2, line 20, "tuned" should read --turned--.
Column 2, line 48, "an exemplary an outgoing" should read --an exemplary outgoing--.
Column 3, line 11, delete "a".
Column 3, line 13, "farther action" should read --further action--.
Column 4, line 10, "thum-" should read --thumb- --.
Column 4, line 11, "bwheel" should read --wheel--.
Column 6, line 35, "places handheld" should read --places the handheld--.
Column 8, line 8, "holds handheld" should read --holds the handheld--.

Signed and Sealed this

Twenty-ninth Day of June, 2010

David J. Kappos
*Director of the United States Patent and Trademark Office*